March 6, 1962 R. R. RABJOHN 3,023,825
POWER OPERATED WHEEL CHAIR
Filed Nov. 17, 1958 3 Sheets-Sheet 1

INVENTOR.
RODNEY ROBERT RABJOHN
BY
William Cleland
ATTORNEY

March 6, 1962  R. R. RABJOHN  3,023,825
POWER OPERATED WHEEL CHAIR
Filed Nov. 17, 1958  3 Sheets-Sheet 2

INVENTOR.
RODNEY ROBERT RABJOHN
BY
William Cleland
ATTORNEY

March 6, 1962

R. R. RABJOHN 3,023,825

POWER OPERATED WHEEL CHAIR

Filed Nov. 17, 1958

INVENTOR.
RODNEY ROBERT RABJOHN
BY
William Cleland
ATTORNEY

United States Patent Office 3,023,825
Patented Mar. 6, 1962

3,023,825
POWER OPERATED WHEEL CHAIR
Rodney Robert Rabjohn, 396 Wildwood Ave.,
Akron, Ohio
Filed Nov. 17, 1958, Ser. No. 774,401
12 Claims. (Cl. 180—15)

This invention relates to a power operated wheel chair, and to a power traction device for a wheel chair.

One object of the invention is to provide an invalid's wheel chair with a compact, steerable, power operated traction unit including a traction wheel which will not interfere with movement of the invalid to and from a seated position in the wheel chair.

Another object of the invention is to provide a wheel chair of the character described having improved means by which it may be steered and controlled by use of one hand, and with a minimum of effort.

Another object of the invention is to provide a wheel chair of the character described having improved means for maintaining the same level on a supporting surface, though the traction wheel may be yieldingly urged into depressions in said surface.

Another object of the invention is to provide a wheel chair of the character described wherein said traction unit is pivotally mounted on said wheel chair and is operable to steer the same, and wherein the means for pivotally mounting said unit includes parts also functioning as slip-contact means for an electrical circuit from a motor of the traction unit to other parts of the wheel chair.

Still another object of the invention is to provide a wheel chair of the character described having said traction unit mounted at one side of the chair, forwardly thereof, and including improved means for holding the chair in a straight course against a tendency of the traction wheel to veer from a straight course.

Another object of the invention is to provide a power traction device which is easily mounted on a conventional wheel chair or like vehicle to propel the same.

These and other objects of the invention will be manifest from the following brief description and the accompanying drawings.

Figure 1:
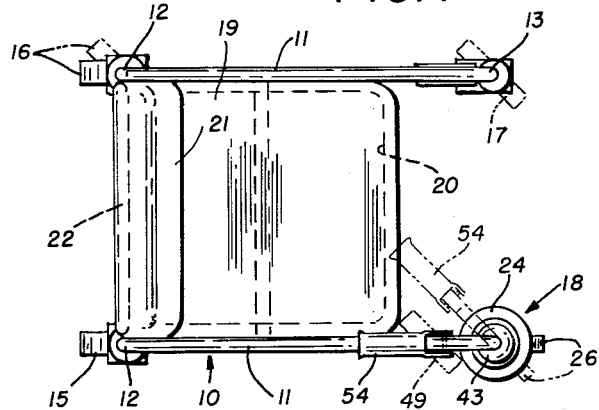
FIGURE 1 is a top plan view of a wheel chair embodying the features of the invention.
Figure 2:
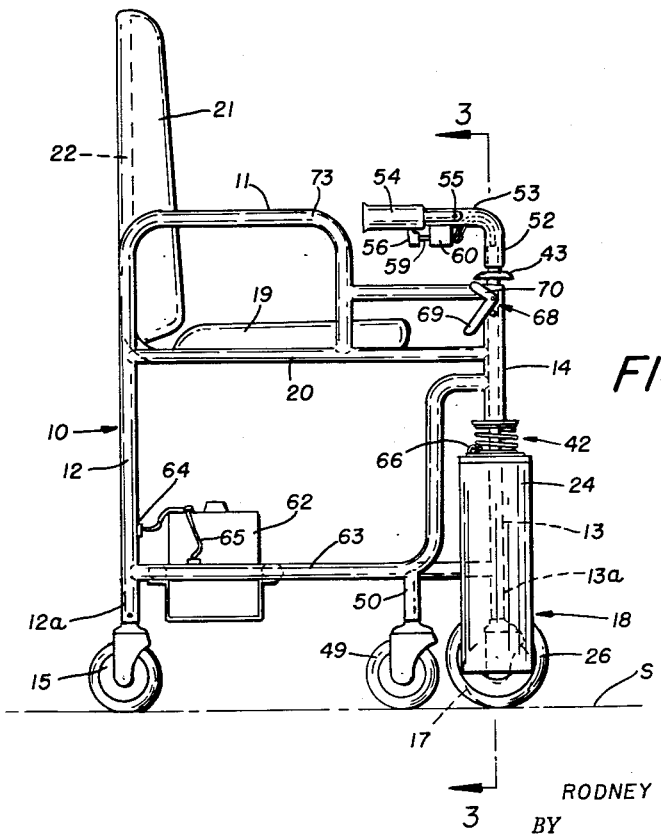
FIGURE 2 is a side elevation thereof, partly broken away, as viewed from the front of FIGURE 1.
Figure 3:
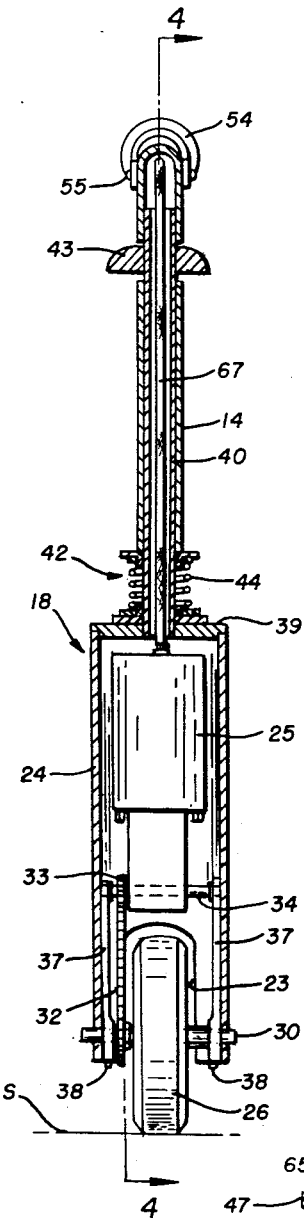
FIGURE 3 is an enlarged vertical cross-section, taken substantially on the line 3—3 of FIGURE 2.
Figure 4:
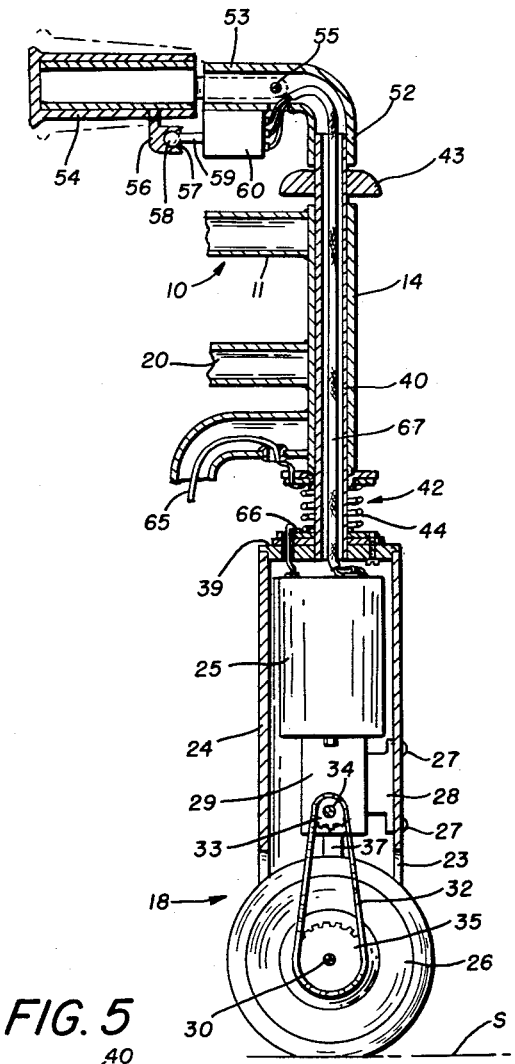
FIGURE 4 is a vertical cross-section, on the same scale as FIGURE 3, taken substantially on the line 4—4 of FIGURE 3.

Referring to FIGURES 1 to 5 of the drawings generally, and to FIGURES 1 and 2 in particular, the numeral 10 designates a wheel chair embodying the features of the invention, and including a frame 11 formed of tubular metal, such as steel. The frame 10 may have two laterally spaced, vertical corner posts 12, 12 at the rear thereof, and laterally spaced vertical corner posts 13 and 14 longitudinally aligned therewith at the front of the same. Rear posts 12, 12 and one front post 13 have downward extensions 12a, 12a and 13a, respectively, to the lower ends of which casters 15, 16 and 17 are attached in a manner to be described. The other front post 14 constituting a bearing element for said traction unit, is made relatively short, as shown in FIGURES 2, 3 and 4, to have the lower end vertically spaced from the supporting surface S, for rotatably mounting a steerable traction device 18, to be described. A cushioned seat 19 is supported on a horizontal section 20 of the frame 11 and a cushioned back 21 for the seat is provided on a vertical backing extension 22 of the frame.

Figure 5:
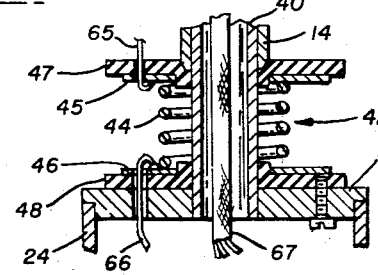
FIGURE 5 is a further enlarged fragmentary cross-section, corresponding to a portion of FIGURE 4, and illustrating the combined spring-mounted steering means and electrical slip-contact means.

Referring particularly to FIGURES 3, 4 and 5, the traction unit 18 may include a cylindrical casing 24 for housing an electric motor 25, which drives a rubber-tired, ground-engaging traction wheel 26, also mounted in the casing to project through the open lower end thereof. Cut-outs 23, 23 in the casing 24 allow the wheel 26 to rotate freely. Motor 25 is removably secured to the casing 24, as by screws 27, 27 extending through the casing wall and threaded into a bracket 28 on a downward extension 29 of motor 25, which extension houses a gear reducing mechanism. The traction wheel 26 may be rotatably mounted on a shaft 30 which has opposite end extensions suitably journalled in diametrically opposed wall portions of casing 24. For driving the traction wheel 26 a continuous chain 32 is extended between a small sprocket 33 on a driving shaft 34, extended through motor casing extension 29, and a larger sprocket 35 non-rotatably affixed on the wheel 26.

For removably mounting the wheel and motor 25 in casing 24 the outer ends of wheel shaft 30 may be rotatably received through the lower ends of spaced elements or bars 37, 37 which depend from the driving shaft 34, suitable bearings being provided for the rotatable connection of both shaft 30 and shaft 34 to the elements 37. Accordingly, upon removal of mounting bracket screws 27, removing shaft 30 from wheel 26, casing 24 and elements 37, and disconnecting certain electrical connections to motor 25, it is possible to remove the motor 25 through the open lower end of the casing 24, by manipulating the spaced elements 37. Conversely, under the same conditions, the motor 25 may be positioned in the casing 24, by manipulating the elements 37 to push the motor upwardly within the casing until the shaft 30 can be positioned as shown in FIGURES 3 and 4. Set screws 38 in the lower ends of elements 37 are operable to fix the shaft 30 against rotation.

For rotatably mounting the traction unit 18 on bearing post or upright 14, to steer the wheel chair, a closure cap 39, removably secured to the upper end of casing 18, has a tubular stem 40 affixed thereon to extend upwardly through the bearing post 14, to be rotatable and axially shiftable therein. In normal ground-engaging position of the wheel 26, frame 11 thereof is yieldingly supported on traction unit 18. A collar 43, affixed on the upper portion of stem 40, is engageable with the upper end of bearing post 14, to limit downward movement of the traction unit.

The shock-absorbing device 42 may including a strong compression spring 44 surrounding a lower portion of stem 40, and yieldingly engaging between top and bottom metal contact discs 45 and 46, which are backed by backing discs 47 and 48, respectively, of dielectric material and suitably non-rotatably secured on the lower end of bearing post 14 and casing cap 39, respectively.

A fifth supporting wheel may be provided by a caster 49 mounted on a downward tubular extension 50 of the lower horizontal section of the frame, located slightly behind wheel 26 and substantially in alignment with the same and rear caster 15. The four casters 12, 13, 15 and 49 are adapted to provide four-point support for the frame 11 particularly when the traction wheel 26 is yieldingly urged by spring 44 into a depression in the supporting surface S. This arrangement is such that the wheel 26 will have requisite traction engagement with surface S, regardless of irregularities therein. The wheel chair, however, will operate satisfactorily without caster 49, so that in some instances this caster may be omitted.

It has been found that the traction unit 18 has a tendency to urge the wheel chair in an arcuate path if all of the other wheels or casters are swively mounted. This condition may be remedied by swivelly mounted all casters except the rear caster 15, or rather the rearmost caster behind the traction unit. In this way the tendency for caster 15 to roll in a straight line offsets the tendency of traction wheel 26 to follow said arcuate path, even when the traction unit is manually held to a straight path by a steering arm 52 affixed on the upper end of rotatable stem 40. The condition referred-to, however, may be remedied by mounting one or other, or both of the rear casters or wheels to be non-swivelling.

The steering arm 52 may be of metal tubing bent to have a rearwardly extending portion 53, on which a hand grip 54 is suitably pivoted at 55 to swing in a vertical plane. A protuberance 56 on the underside of grip 54 has a socket 57, receiving a ball end 58 of a spring-pressed toggle arm 59 of a suitable three-way electric switch 60, secured to the underside of handle extension 53. The switch is of a type in which the toggle arm 59 is easily selectively moved, as in a vertical plane, to forward (down), reverse (up) and neutral or off (horizontal) positions (see full and chain-dotted positions in FIGURE 4). The switch 60 is of known type in which toggle 59 is spring-loaded in neutral position, so that toggle 59 must be yieldingly held in both the forward and reverse positions, or the toggle will return to neutral position.

For electrically operating the motor 25 to rotate the traction wheel 26, a battery 62 is removably mounted on a lower horizontal section 63 of the frame 11. One side of the battery may be grounded to the metal frame 11 at 64. The hot side is connected to the motor 25 through a lead wire 65 received through hollow tubing of the frame 11 to a point above the shock-absorbing device 42, through upper contact disc 45, spring 44, contact disc 46, and a lead wire 66 to the top of the motor 25. Suitable wiring 67 in a grounded reversing circuit extends from the motor 25 to the switch 60, through the hollow stem 40 and hollow handle 53. The wiring 67 is carried by the rotatable or steerable parts, without twisting or relative movement with respect thereto, while the wires 65 and 66, carried by relatively fixed frame 11 and the relatively rotatable traction device 18, respectively, are connected through the spring 44, which serves a double purpose of a slip-contact device and a shock-absorbing device.

At times it may be desirable to move or manipulate the wheel chair manually. For this purpose a lifting device 68 may be provided to lift the traction unit 18, and thereby to elevate the wheel 26 out of engagement with surface S. The lifting device may comprise an arm 69 pivotable on bearing post 14 to engage an angular cam extension 70 of the arm under the collar 43 affixed on rotatable stem 40, and thereby to raise said stem and associated parts for the purposes described.

In use of the wheel chair described above, an invalid is seated on the seat 19, with the right arm resting on arm rail 73 of the frame, and with the right hand holding the hand grip 54. By downward or forward pressure on the hand grip the protuberance 56 will trip the toggle lever 59 of switch 60, to connect the battery 62 with motor 25 and operate the same in forward and reverse directions, respectively. Such operation of motor 25 will, through sprocket 33, sprocket 35, and chain 32, drive wheel 26 for corresponding tractional engagement with the surface and thereby move the wheel chair. The hand grip 54 will be yieldingly held in this forward position by manual pressure on the toggle lever 59, and the operator may, through lateral pressure on the hand-grip in proper direction, turn the stem 40, thereby to turn the traction device to steer the wheel chair in desired direction. When the hand-grip 54 is held to guide the wheel chair in a straight course, the non-swivelling rear caster or casters will off-set any tendency for the traction wheel to swing the wheel chair in an arc.

As previously described, the lifting device 68 is operable to raise the traction device out of engagement of wheel 26 with the surface S, so that the wheel chair may be manually maneuvered by someone other than the occupant of the same.

Figure 7:
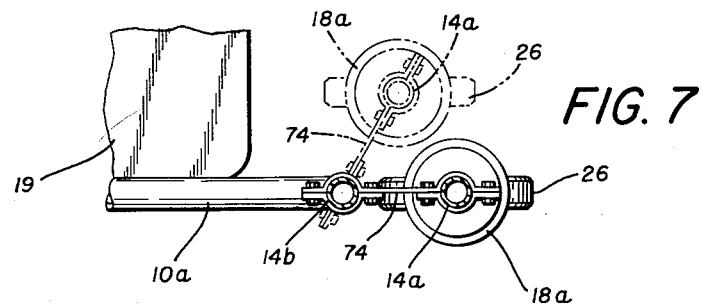
FIGURE 7 is a horizontal cross-section taken substantially on the line 7—7 of FIGURE 6.
Figure 6:
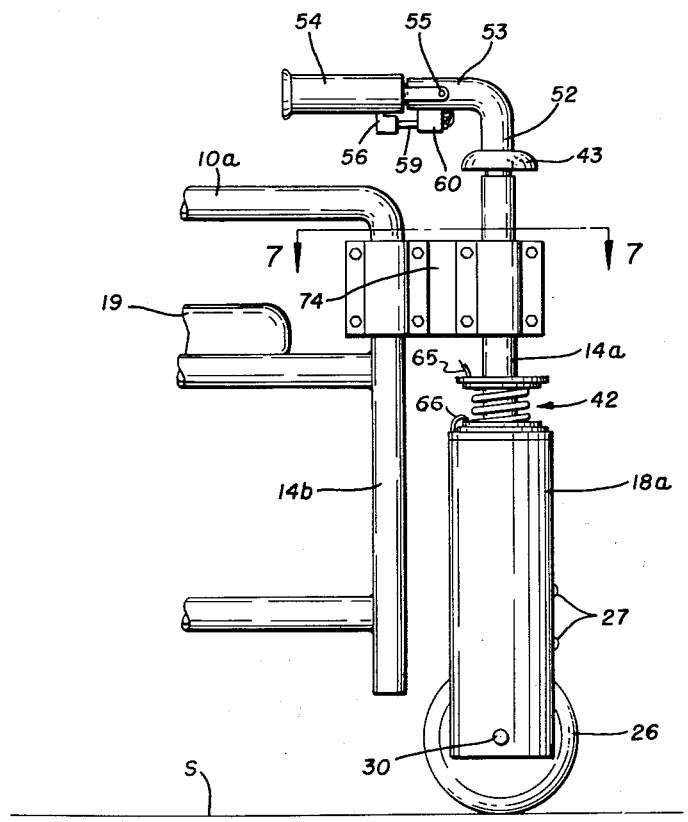
FIGURE 6 is an enlarged fragmentary side elevation, corresponding in part to FIGURE 2, illustrating a modified form of power traction unit, attached to a forward part of a conventional wheel chair to propel the same.

Referring to the modified form of the invention of FIGURES 6 and 7, there is illustrated a power traction unit 18a, which is in all respects like traction unit 18, except that instead of the hollow stem 40 being rotatable in post 14 of the wheel chair 10, it is rotatably received in a tubular bearing member 14a, in turn removably and adjustably attached to a post 46 of a conventional wheel chair 10a or similar vehicle, by means of a suitable attaching bracket 74 as shown. Like parts otherwise are given like numerals unless otherwise noted. Bracket 74 is adapted to be vertically and angularly adjustable to various positions with respect to post 14b (see chain-dotted position in FIGURE 7). In the use shown, however, the front caster has been removed from the lower end of post 14b. By this means, also, the unit 18a may be mounted at the rear of a wheel chair, or to a convenient part of other relatively small conveyances, such as coaster wagons.

Modifications of the invention may be resorted to without departing from the spirit thereof or the scope of the appended claims.

What is claimed is:

1. A wheel chair comprising a frame, a plurality of ground-engaging wheels mounted on said frame to support the frame on a surface, a vertical bearing element affixed on a forward end of said frame, a hollow casing having an opening in the bottom thereof and having an upwardly extending stem portion rotatable in said bearing element about a vertical axis and axially shiftable with respect thereto, stop means for limiting axial shifting of said stem to a stop position within said bearing element, shock-absorbing spring means yieldingly urging said stem axially downwardly with respect to said bearing element to said stop position, a motor unit removably mounted in said casing, a traction wheel, means for rotatably mounting said traction wheel in said casing below said motor unit to have at least the lower portion of the traction wheel exposed through said opening, and power transmission means connected between said motor unit and said wheel for rotating the traction wheel.

2. A wheel chair as set forth in claim 1, including locking means operable to lift said casing against the yielding action of said spring means to lock the casing with said traction wheel out of engagement with said surface.

3. A wheel chair as set forth in claim 2, said stop means including a collar affixed on said stem and held in engagement with the upper end of said bearing element in said stop position, said locking means including a pivoted cam engageable with a portion of said collar and manually operable means for pivoting said cam against said collar portion to lift said stem and casing.

4. A wheel chair as set forth in claim 1, the upper end of said stem having a rearward extension providing a steering handle for turning said casing and traction wheel, said handle having a hand-grip shiftable thereon, electrical means for reversibly operating said motor and including electrical connections to said handle, a reversing switch on said handle and having said electrical connections connected thereto, means operable by shifting said hand-grip to control said reversing switch for said reversible operation of the motor.

5. A power traction device for a wheel chair or like vehicle, comprising a hollow casing rotatably supporting a traction wheel, an electrically operable motor unit mounted in said casing, transmission means between said motor unit and said traction wheel to rotate the same with respect to the housing, means including an electrical circuit for connecting said motor to a source of electrical power, means for mounting said casing on the vehicle to rotate about a vertical axis, and means on said casing for manually turning the same and the wheel about said vertical axis to steer the vehicle, said means for manually turning including an upward extension from said casing and a hand-grip pivoted thereon, a switch on said extension being connected in said electrical circuit and having a spring-pressed operating element, means being provided on said hand-grip operable by pivoting the same yieldingly to move said operating element and thereby control said switch to operate said motor.

6. A power traction device for a wheel chair or like vehicle, comprising a hollow casing having an opening in the bottom thereof, a motor unit removably mounted in said casing and including a driving shaft, a traction wheel, means for rotatably mounting said traction wheel in said casing below said motor unit to have at least the lower portion of the traction wheel exposed through said opening, and power transmission means connected between said driving shaft and said wheel for rotating the traction wheel, said wheel-mounting means including spaced members depending from said motor unit, and a driven shaft received through opposite wall portions of said housing, through the lower ends of said members, and through said wheel, whereby said motor unit, said traction wheel and said transmission means are insertible and removable as an assembly through said casing opening when said driven shaft is removed.

7. A power traction device for a wheel chair or like vehicle, comprising a hollow casing having an opening in the bottom thereof, a motor unit removably mounted in said casing and including a driving shaft, a traction wheel, means for rotatably mounting said traction wheel in said casing below said motor unit to have at least the lower portion of the traction wheel exposed through said opening, and power transmission means connected between said driving shaft and said wheel for rotating the traction wheel, said wheel-mounting means including spaced members depending from said motor unit, and a driven shaft received through opposite wall portions of said housing, through the lower ends of said members, and through said wheel, whereby said motor unit, said traction wheel and said transmission means are insertible and removable as an assembly through said casing opening when said driven shaft is removed, said driven shaft having outer ends journalled on said members, said transmission means including a driving wheel on said driven shaft, a driven wheel affixed on said traction wheel and a continuous transmission element between said driving and driven wheels.

8. A power traction device for a wheel chair or like vehicle, comprising a hollow casing having an opening in the bottom thereof, a motor unit removably mounted in said casing and including a driving shaft, a traction wheel, means for rotatably mounting said traction wheel in said casing below said motor unit to have at least the lower portion of the traction wheel exposed through said opening, and power transmission means connected between said driving shaft and said wheel for rotating the traction wheel, said wheel-mounting means including spaced members depending from said motor unit, and a driven shaft received through opposite wall portions of said housing, through the lower ends of said members, and through said wheel, whereby said motor unit, said traction wheel and said transmission means are insertible and removable as an assembly through said casing opening when said driven shaft is removed, said driven shaft having outer ends journalled on said members, said transmission means including a driving wheel on said driven shaft, a driven wheel affixed on said traction wheel and a continuous transmission element between said driving and driven wheels, a driving shaft being provided in the motor unit and carrying said driving wheel, said driving shaft having extensions rotatably journalled in the upper end of said members and supporting the same in said dependent relation from the motor unit.

9. A power traction device for a wheel chair or like vehicle, comprising a hollow casing having an opening in the bottom thereof, a motor unit removably mounted in said casing and including a driving shaft, a traction wheel, means for rotatably mounting said traction wheel in said casing below said motor unit to have at least the lower portion of the traction wheel exposed through said opening, and power transmission means connected between said driving shaft and said wheel for rotating the traction wheel, a support being included in relatively fixed relation with respect to said casing and having a vertical bearing element, said casing having an upwardly extending stem portion rotatable in said bearing element about a vertical axis, stop means limiting axial movement of said stem to a stop position within said bearing element, and shock-absorbing spring means yieldingly urging said stem axially within said bearing element toward said stop position.

10. A power traction device for a wheel chair or like vehicle, comprising a hollow casing having an opening in the bottom thereof, a motor unit removably mounted in said casing and including a driving shaft, a traction wheel, means for rotatably mounting said traction wheel in said casing below said motor unit to have at least the lower portion of the traction wheel exposed through said opening, and power transmission means connected between said driving shaft and said wheel for rotating the traction wheel, a support being included in relatively fixed relation with respect to said casing and having a vertical bearing element, said casing having an upwardly extending stem portion rotatable in said bearing element about a vertical axis, stop means limiting axial movement of said stem to a stop position within said bearing element, and shock-absorbing spring means yieldingly urging said stem axially within said bearing element toward said stop position, said spring means including spaced upper and lower plates of dielectric material non-rotatably mounted on said support and said casing respectively, upper and lower annular contact elements positioned against the inwardly opposed sides of the corresponding said plates, and a compression spring yieldingly engageable between said contact elements, an electrical connection being provided to said motor through said contact elements and the spring engaged therebetween.

11. A power traction device for a wheel chair or like vehicle, comprising a hollow casing having an opening in the bottom thereof, a motor unit removably mounted in said casing and including a driving shaft, a traction wheel, means for rotatably mounting said traction wheel in said casing below said motor unit to have at least the lower portion of the traction wheel exposed through said opening, and power transmission means connected between said driving shaft and said wheel for rotating the traction wheel, a support being included in relatively fixed relation with respect to said casing and having a vertical bearing element, said casing having an upwardly extending stem portion rotatable in said bearing element about a vertical axis, stop means limiting axial movement of said stem to a stop position within said bearing element, and shock-absorbing spring means yieldingly urging said stem axially within said bearing element toward said stop position, said spring means including spaced upper and lower plates of dielectric material non-rotatably mounted on said support and said casing respectively, upper and lower annular contact elements positioned against the inwardly opposed sides of the corresponding said plates, and a compression spring yieldingly engageable between said contact elements, an electrical connection being provided to said motor through said contact elements and the spring engaged therebetween, at least one other electrical connection being provided to said motor through said stem.

12. A wheel chair comprising a frame, a vertical bearing element affixed on a forward end of said frame at one side of the same, a hollow casing having an opening in the bottom thereof and having an upwardly extending stem portion rotatable in said bearing element about a vertical axis of the casing, a traction wheel rotatably mounted in said casing and constituting one front wheel of the vehicle, power transmission means in said casing for driving said traction wheel, a front idler wheel laterally spaced from said traction wheel, laterally spaced rear idler wheels longitudinally aligned with respect to said front wheels, said stem portion having a rearward extension providing a steering handle for turning said traction wheel through said casing, said front idler wheel and the rear idler wheel aligned therewith being swivelly mounted and the other rear idler wheel aligned with said traction wheel being non-swivelly mounted and thereby to offset the tendency for the driven traction wheel to urge the chair in an arcuate path.

References Cited in the file of this patent
UNITED STATES PATENTS

| | | |
|---|---|---|
| 1,804,541 | Perin | May 12, 1931 |
| 2,325,396 | Hastings | July 27, 1943 |
| 2,443,480 | Schwitzer et al. | June 15, 1948 |
| 2,448,992 | Love et al. | Sept. 7, 1948 |
| 2,482,203 | Peterson et al. | Sept. 20, 1949 |
| 2,564,002 | Gibson | Aug. 14, 1951 |
| 2,618,396 | Belt | Nov. 18, 1952 |
| 2,635,703 | Goeller | Apr. 21, 1953 |
| 2,820,644 | Smith | Jan. 21, 1958 |